United States Patent
Kobayashi et al.

(10) Patent No.: US 11,280,250 B2
(45) Date of Patent: Mar. 22, 2022

(54) ENGINE COOLING WATER TEMPERATURE CONTROL METHOD AND CONTROL APPARATUS

(71) Applicant: Nissan Motor Co., Ltd., Yokohama (JP)

(72) Inventors: Azusa Kobayashi, Kanagawa (JP); Hiroki Eguchi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 164 days.

(21) Appl. No.: 16/770,812

(22) PCT Filed: Dec. 15, 2017

(86) PCT No.: PCT/JP2017/045174
§ 371 (c)(1),
(2) Date: Jun. 8, 2020

(87) PCT Pub. No.: WO2019/116558
PCT Pub. Date: Jun. 20, 2019

(65) Prior Publication Data
US 2020/0332700 A1    Oct. 22, 2020

(51) Int. Cl.
*F01P 7/14*    (2006.01)
*F02D 41/14*    (2006.01)

(52) U.S. Cl.
CPC ............. *F01P 7/14* (2013.01); *F02D 41/14* (2013.01); *F01P 2025/13* (2013.01);
(Continued)

(58) Field of Classification Search
CPC ...... F01P 7/14; F01P 2025/13; F01P 2025/64; F01P 2025/66; F01P 7/16; F01P 7/167;
(Continued)

(56) References Cited

U.S. PATENT DOCUMENTS

2006/0068971 A1    3/2006  Kobayashi
2015/0367835 A1    12/2015 Ikedaya et al.

FOREIGN PATENT DOCUMENTS

JP    2000-179670 A       6/2000
JP    2000179670 A   *   6/2000
(Continued)

*Primary Examiner* — Jacob M Amick
*Assistant Examiner* — Charles J Brauch
(74) *Attorney, Agent, or Firm* — Young Basile Hanlon & MacFarlane, P.C.

(57) ABSTRACT

Method of controlling cooling water temperature of an engine in which the lower limit value of engine rotation speed is set according to outside air temperature and vehicle speed. When the vehicle starts traveling, a temperature raising-state lower limit rotation speed is set to raise the cooling water temperature to a third threshold value. After the cooling water temperature is raised to the third threshold value, the lower limit value is not set. If the cooling water temperature drops to a second threshold value, a maintaining-state lower limit rotation speed lower than the temperature raising-state lower limit rotation speed is set to raise the cooling water temperature. If the cooling water temperature does not rise but drops to a first threshold value, a temperature re-raising-state lower limit rotation speed lower than the temperature raising-state lower limit rotation speed and higher than the maintaining-state lower limit rotation speed is set.

11 Claims, 7 Drawing Sheets

(52) U.S. Cl.
CPC ....... *F01P 2025/64* (2013.01); *F01P 2025/66* (2013.01); *F02D 2200/101* (2013.01); *F02D 2200/501* (2013.01); *F02D 2200/70* (2013.01)

(58) Field of Classification Search
CPC .................. F01P 2025/08; F02D 41/14; F02D 2200/101; F02D 2200/501; F02D 2200/70; F02D 41/06; F02D 41/1401; F02D 31/001; F02D 2200/021; B60L 2240/445; B60L 2270/142; B60L 1/02; B60L 50/16; Y02T 10/62; Y02T 10/70; Y02T 10/7072; F02N 19/00
See application file for complete search history.

(56) References Cited

FOREIGN PATENT DOCUMENTS

| | | |
|---|---|---|
| JP | 2006-105178 A | 4/2006 |
| JP | 2006-138306 A | 6/2006 |
| JP | 2007-245753 A | 9/2007 |
| JP | 2008-184065 A | 8/2008 |
| JP | 2013-071715 A | 4/2013 |
| JP | 2013-086728 A | 5/2013 |
| JP | 2016-007884 A | 1/2016 |

\* cited by examiner

ENGINE COOLING WATER TEMPERATURE CONTROL METHOD AND CONTROL APPARATUS

TECHNICAL FIELD

The present invention relates to an engine cooling water temperature control method and control apparatus for controlling the cooling water temperature of an engine mounted in a vehicle.

BACKGROUND

Japanese Patent Application Publication No. 2013-086728 discloses a hybrid vehicle in which its engine is turned on and off so as to quickly eject warm air at desired temperature and also threshold values for the cooling water temperature based on which the engine is turned on and off are varied according to the outside air temperature and the vehicle speed to thereby reduce noise.

Japanese Patent Application Publication No. 2013-086728, however, contains no mention that the heat generation amount of the engine is controlled based on factors that drop the cooling water temperature of the engine such as the outside air temperature and the vehicle speed. Thus, there is a problem in that the cooling water temperature of the engine cannot be quickly raised and it takes time to warm up the cabin.

SUMMARY

The present invention has been made to solve such an existing problem, and an object thereof is to provide an engine cooling water temperature control method and control apparatus capable of quickly raising the cooling water temperature of an engine.

In an aspect of the present invention, a lower limit value of an engine heat generation amount is set according to a factor of drop in cooling water temperature of an engine.

According to the one aspect of the present invention, it is possible to quickly raise the cooling water temperature of an engine.

DETAILED DESCRIPTION

An embodiment of the present invention will be described below with reference to the drawings.

[Description of Configuration in This Embodiment]

Figure 1:
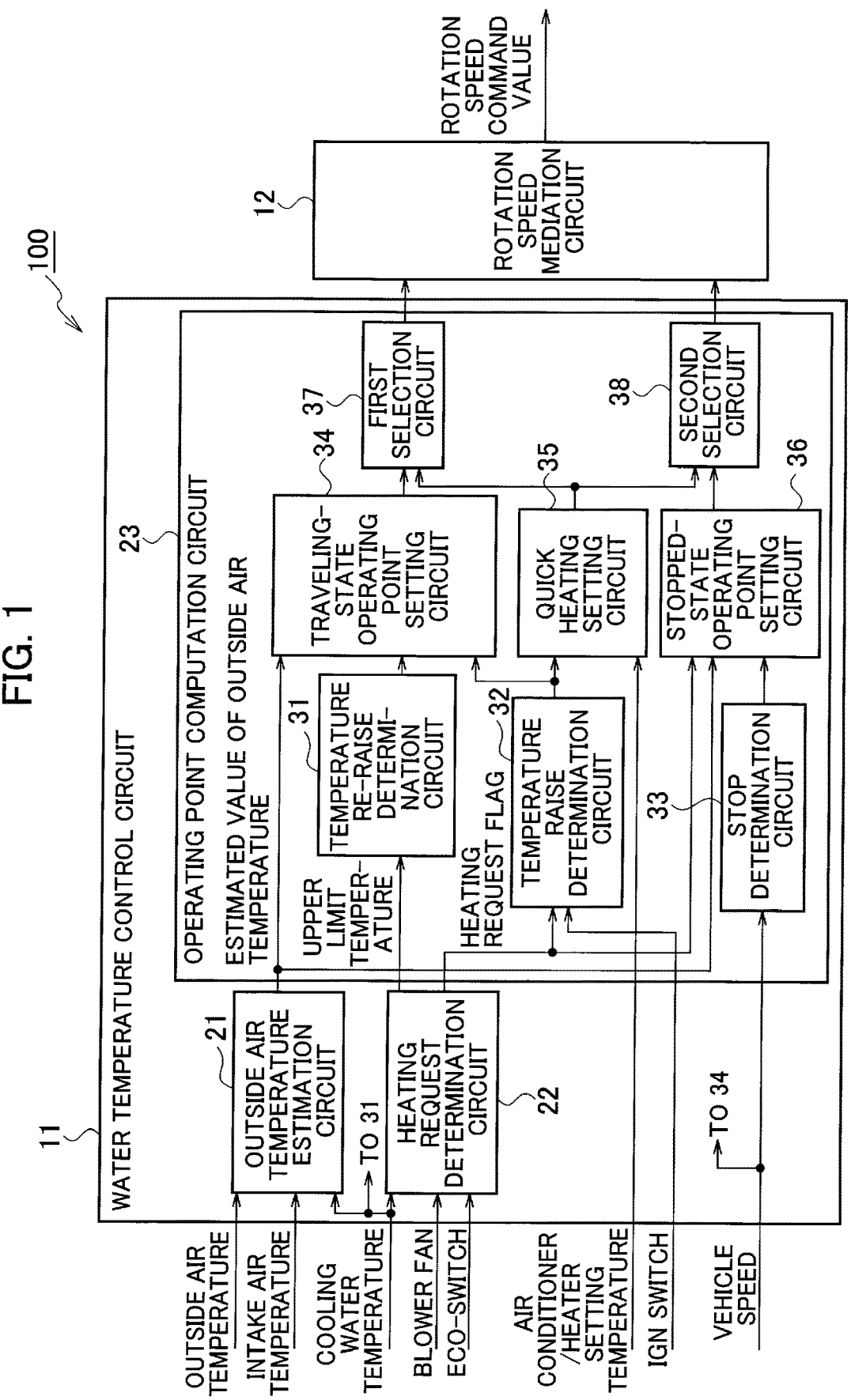
FIG. 1 is a block diagram illustrating a configuration of an engine cooling water temperature control apparatus according to an embodiment of the present invention.
Figure 2:
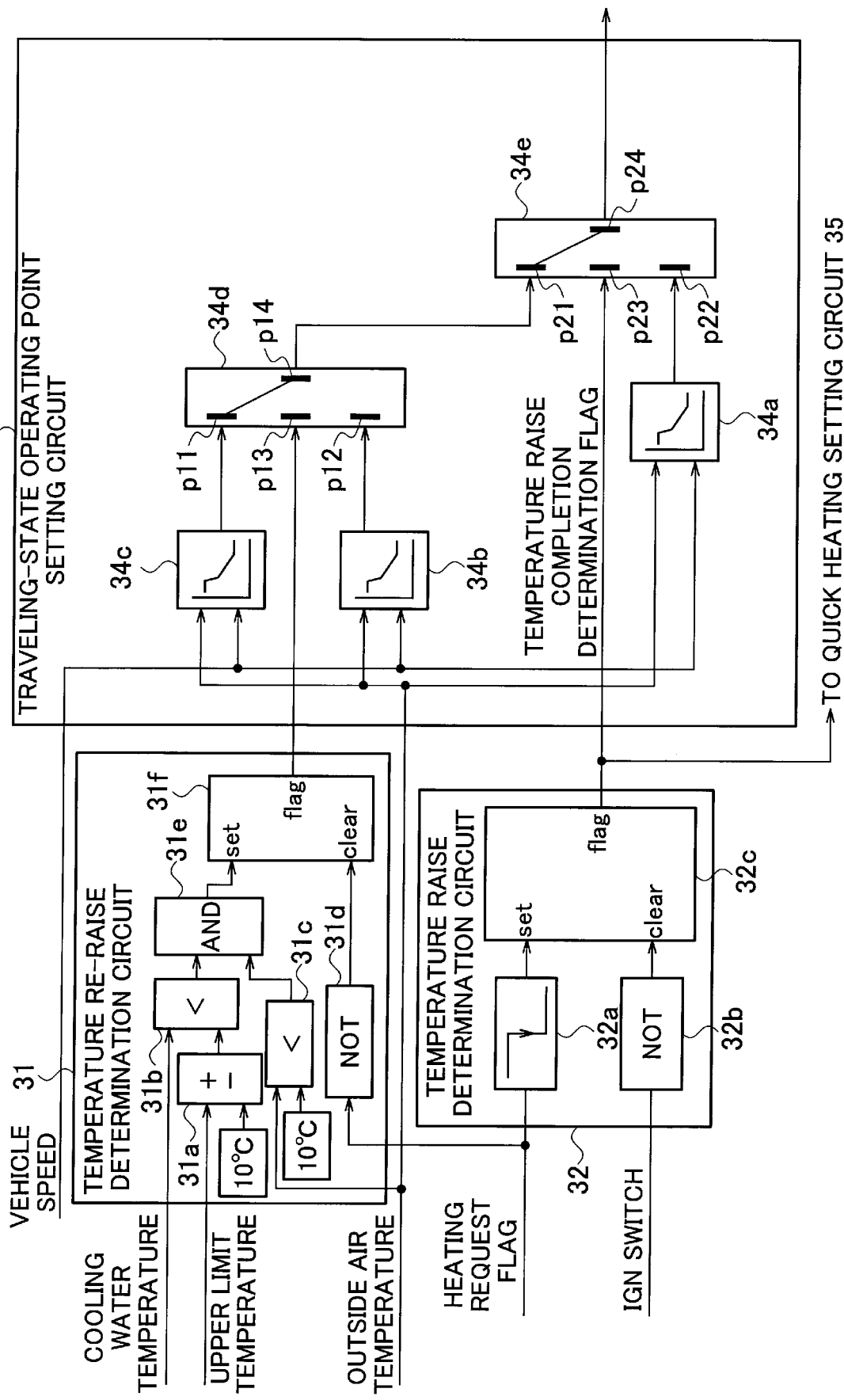
FIG. 2 is a block diagram illustrating specific configurations of a temperature re-raise determination circuit, a temperature raise determination circuit, and a traveling-state operating point setting circuit.

FIG. 1 is a block diagram illustrating a configuration of an engine cooling water temperature control apparatus 100 according to an embodiment of the present invention, and FIG. 2 is a block diagram illustrating specific configurations of a temperature re-raise determination circuit 31, a temperature raise determination circuit 32, and a traveling-state operating point setting circuit 34 illustrated in FIG. 1.

Note that a description will be given of an example in which the engine cooling water temperature control apparatus according to this embodiment is mounted in a hybrid vehicle that includes an engine and a power generation motor connected to the engine and causes the engine to perform firing operation or motoring operation for the vehicle to travel. The firing operation refers to operation in which the engine is supplied with a fuel and caused to combust it to rotate the power generation motor and thereby generate electricity. The motoring operation refers to operation in which the engine is not caused to fire and the power generation motor rotates the engine to lower the SOC of a battery.

As illustrated in FIG. 1, the engine cooling water temperature control apparatus 100 according to this embodiment is mounted in a vehicle and controls the cooling water temperature of its engine, and includes a water temperature control circuit 11 and a rotation speed mediation circuit 12. The water temperature control circuit 11 includes an outside air temperature estimation circuit 21 that estimates the outside air temperature around the vehicle, a heating request determination circuit 22, and an operating point computation circuit 23.

The water temperature control circuit 11 and the rotation speed mediation circuit 12 can be implemented by using a microcomputer including a CPU (central processing unit), a memory, and an input-output unit. A computer program that causes the microcomputer to function as the water temperature control circuit 11 or the rotation speed mediation circuit 12 is installed in the microcomputer and executed. As a result, the microcomputer functions as a plurality of information processing circuits included in the water temperature control circuit 11 or the rotation speed mediation circuit 12. Note that the following will discuss an example where the water temperature control circuit 11 and the rotation speed mediation circuit 12 are implemented by software, but they can of course be configured by preparing dedicated pieces of hardware for executing corresponding information processing. Moreover, the plurality of circuits included in the water temperature control circuit 11 and the rotation speed mediation circuit 12 may be configured by using individual pieces of hardware.

The outside air temperature estimation circuit 21 illustrated in FIG. 1 estimates the outside air temperature based on the temperature of air sucked in from an air intake port in the vehicle or on the cooling water temperature. The outside air temperature estimation circuit 21 outputs the estimated value of the outside air temperature to the traveling-state operating point setting circuit 34 and a stopped-state operating point setting circuit 36 to be described later. Note that instead of estimating the outside air temperature, the outside air temperature estimation circuit 21 may obtain the outside air temperature detected by a temperature sensor provided on the outside of the vehicle. Meanwhile, "the cooling water temperature of the engine" will also be abbreviated simply as "cooling water temperature" below.

The heating request determination circuit 22 obtains an eco-switch input signal, a blower fan drive signal, and the outside air temperature, sets the upper limit temperature (e.g., 70° C.) of the cooling water temperature based on these, and outputs the upper limit temperature to the temperature re-raise determination circuit 31. Also, based on the cooling water temperature, the upper limit temperature of the cooling water temperature, and a hysteresis value (e.g., 5° C.), the heating request determination circuit 22 outputs a heating request flag indicating whether a heating request has occurred, to the temperature raise determination circuit 32 and the stopped-state operating point setting circuit 36. The heating request determination circuit 22 sets the heating request flag from "1" to "0" when the cooling water temperature shifts from a state where it is lower than the upper limit temperature of the cooling water temperature to a state where it is higher than the upper limit temperature, and sets the heating request flag from "0" to "1" when the cooling water temperature shifts from a state where it is higher than a value obtained by subtracting the hysteresis value from the upper limit temperature of the cooling water temperature (e.g., 65° C.) to a state where it is lower than the value. Note that a second threshold value can be changed to a temperature other than 65° C. by changing the subtracted hysteresis value (5° C. in the above case) as appropriate.

The operating point computation circuit 23 includes the temperature re-raise determination circuit 31, the temperature raise determination circuit 32, a stop determination circuit 33, the traveling-state operating point setting circuit 34, a quick heating setting circuit 35, and the stopped-state operating point setting circuit 36. The operating point computation circuit 23 further includes a first selection circuit 37 and a second selection circuit 38. The operating point computation circuit 23 sets the lower limit value of the engine heat generation amount (e.g., the lower limit value of the engine rotation speed) and the engine output torque according to factors of drop in cooling water temperature such as the outside air temperature and the vehicle speed, and outputs a control command to the rotation speed mediation circuit 12.

In other words, the operating point computation circuit 23 has the function of a lower limit value setting unit that sets the lower limit value of the engine heat generation amount according the factors of drop in cooling water temperature such as the vehicle speed and the outside air temperature. In this embodiment, a description will be given of an example in which a limit is set on the lower limit value of the engine rotation speed as the lower limit value of the engine heat generation amount.

The stop determination circuit 33 obtains vehicle speed data from, for example, a wheel speed sensor or the like and determines whether the vehicle is in a stopped state. In an example, the stop determination circuit 33 determines that the vehicle is in a stopped state when the vehicle speed is zero or when the speed falls below a threshold value which is set at near zero.

The traveling-state operating point setting circuit 34 sets the operating point of the engine in a state where the vehicle is traveling. The "operating point" represents the lower limit value of the engine rotation speed and the engine output torque.

The temperature re-raise determination circuit 31 outputs a flag "1" indicating that the cooling water temperature has dropped to 60° C. (first threshold value) when the cooling water temperature drops and reaches 60° C. after finishing being raised and reaching the upper limit temperature (e.g., 70° C.; third threshold value).

When the vehicle starts traveling, the temperature raise determination circuit 32 determines whether the cooling water temperature has risen to the upper limit temperature (e.g., 70° C.). If the cooling water temperature has risen to 70° C., the temperature raise determination circuit 32 sets a temperature raise completion determination flag at "1", indicating that the temperature raise has been completed, and outputs it to the traveling-state operating point setting circuit 34 and the quick heating setting circuit 35.

Note that details of the traveling-state operating point setting circuit 34, the temperature re-raise determination circuit 31, and the temperature raise determination circuit 32 will be described later with reference to FIG. 2.

The quick heating setting circuit 35 receives air conditioner/heater setting temperature data as an external input, and sets and outputs an engine rotation speed for quick heating if it is necessary to immediately raise the cooling water temperature to a desired temperature to enable the heater to function.

Upon input of a signal indicating that the vehicle is in a stopped state from the stop determination circuit 33, the stopped-state operating point setting circuit 36 sets the lower limit value of the engine rotation speed in the stopped state based on the estimated value of the outside air temperature and the heating request flag and outputs the lower limit value. Specifically, the stopped-state operating point setting circuit 36 outputs the engine rotation speed at the point in the graph of FIG. 3 to be mentioned later at which the vehicle speed indicated on the horizontal axis is zero, as the lower limit value (e.g., 1800 rpm).

The first selection circuit 37 selects the larger of the lower limit value of the engine rotation speed outputted from the traveling-state operating point setting circuit 34 and the lower limit value of the engine rotation speed outputted from the quick heating setting circuit 35, and outputs the larger value to the rotation speed mediation circuit 12. When the air conditioner/heater setting temperature is not set, the lower limit value of the engine rotation speed for quick heating is not set in the quick heating setting circuit 35, and therefore the lower limit value of the engine rotation speed outputted from the traveling-state operating point setting circuit 34 is selected.

The second selection circuit 38 selects the larger of the lower limit value of the engine rotation speed outputted from the stopped-state operating point setting circuit 36 and the lower limit value of the engine rotation speed outputted from the quick heating setting circuit 35, and outputs the larger value to the rotation speed mediation circuit 12. When the air conditioner/heater setting temperature is not set, the lower limit value of the engine rotation speed for quick heating is not set in the quick heating setting circuit 35, and therefore the lower limit value of the engine rotation speed outputted from the stopped-state operating point setting circuit 36 is selected.

The rotation speed mediation circuit 12 controls the rotational speed and output torque of the engine based on the lower limit value of the engine rotation speed and the engine output torque outputted from the water temperature control circuit 11. The rotation speed mediation circuit 12 further controls switching between the firing operation and the motoring operation.

Next, specific configurations and operations of the traveling-state operating point setting circuit 34, the temperature re-raise determination circuit 31, and the temperature raise determination circuit 32 will be described with reference to FIG. 2.

(Configuration and Operation of Traveling-State Operating Point Setting Circuit 34)

The traveling-state operating point setting circuit 34 includes three maps 34a, 34b, and 34c and two switchers 34d and 34e.

The map 34a is a map indicating the correspondence between the outside air temperature and vehicle speed in a state where the vehicle is traveling and the lower limit value of the engine rotation speed in a temperature raising state (hereinafter referred to as "temperature raising-state lower limit rotation speed"). Upon input of a vehicle speed and an outside air temperature, the map 34a outputs the temperature raising-state lower limit rotation speed corresponding to them. "Temperature raising state" means raising the water temperature of the engine cooling water to the upper limit temperature (third threshold value) from a state where the water temperature has dropped to about the ambient temperature (e.g., 25° C.), such as when the vehicle starts traveling. In one example, the upper limit temperature is 70° C.

The map 34b is a map indicating the correspondence between the outside air temperature and vehicle speed in a state where the vehicle is traveling and the lower limit value of the engine rotation speed in a maintaining state (hereinafter referred to as "maintaining-state lower limit rotation speed"). Upon input of a vehicle speed and an outside air temperature, the map 34b outputs the maintaining-state lower limit rotation speed corresponding to them. "Maintaining state" means maintaining the cooling water temperature in the range of 65° C. (second threshold value) to 70° C. (third threshold value) in the case where the cooling water temperature reaches 70° C., which is the upper limit temperature, once and this cooling water temperature then drops. When the cooling water temperature reaches 70° C. and the lower limit rotation speed switches from the temperature raising-state lower limit rotation speed to the maintaining-state lower limit rotation speed, the heating request flag is set at "0" and therefore the lower limit value of the engine rotation speed is not set until the cooling water temperature then drops to 65° C. (second threshold value). Specifically, as will be described later, when the heating request flag is "0", control is performed such that the maintaining-state lower limit rotation speed is not outputted from the map 34b even if an input terminal p12 and an output terminal p14 of the switcher 34d are connected. Alternatively, when the heating request flag is "0", control is performed such that the output of the traveling-state operating point setting circuit 34 illustrated in FIG. 1 is not selected. Thus, in this period, the engine rotation speed or the operation may be switched to the monitoring operation based on other conditions. When the cooling water temperature drops to 65° C., the heating request flag shifts back to "1" and therefore the map 34b outputs the maintaining-state lower limit rotation speed.

The map 34c is a map indicating the correspondence between the outside air temperature and vehicle speed in a state where the vehicle is traveling and the lower limit value of the engine rotation speed in a temperature re-raising state (hereinafter referred to as "temperature re-raising-state lower limit rotation speed"). The temperature re-raising-state lower limit rotation speed represents a temperature re-raising-state lower limit heat generation amount being the lower limit heat generation amount in a temperature re-raising state. Upon input of a vehicle speed and an outside air temperature, the map 34c outputs the temperature re-raising-state lower limit rotation speed corresponding to them. "Temperature re-raising state" means re-raising the cooling water temperature back to 70° C. in the case where the cooling water temperature after reaching 70° C. drops below 65° C. and further drops to 60° C. (first threshold value), which is a temperature obtained by subtracting the hysteresis value (5° C.) from 65° C. In sum, the map 34c outputs the temperature re-raising-state lower limit rotation speed if the above-described maintaining-state lower limit rotation speed has been set but the cooling water temperature drops below 60° C. Note that the hysteresis value can be changed to a temperature other than 5° C.

The switcher 34d includes three input terminals p11, p12, and p13 and the output terminal p14. Upon input of a flag "1" into the input terminal p13, the switcher 34d outputs a signal inputted into the input terminal p11 from the output terminal p14. On the other hand, upon input of a flag "0" into the input terminal p13, the switcher 34d outputs a signal inputted into the input terminal p12 from the output terminal p14. In sum, the switcher 34d selectively outputs one of the signals inputted into the input terminals p11 and p12 based on whether the flag inputted into the input terminal p13 is "0" or "1".

The switcher 34e likewise includes three input terminals p21, p22, and p23 and an output terminal p24. Upon input of a flag "1" into the input terminal p23, the switcher 34e outputs a signal inputted into the input terminal p21 from the output terminal p24. Upon input of a flag "0", the switcher 34e outputs a signal inputted into the input terminal p22 from the output terminal p24.

(Configuration and Operation of Temperature Re-Raise Determination Circuit 31)

Next, the temperature re-raise determination circuit 31 will be described. As illustrated in FIG. 2, the temperature re-raise determination circuit 31 includes a subtractor 31a, comparators 31b and 31c, a NOT circuit 31d, an AND circuit 31e, and an arithmetic unit 31f.

The subtractor 31a outputs a temperature (e.g., 60° C.) obtained by subtracting 10° C. from the upper limit temperature (e.g., 70° C.) for the raising of the temperature of the cooling water to the comparator 31b.

The comparator 31b compares a cooling water temperature outputted from a water temperature sensor (not illustrated) and 60° C. (first threshold value), and outputs a flag "1" when the cooling water temperature is lower, that is, when the cooling water temperature drops to 60° C. Note that the first threshold value can be changed to a temperature other than 60° C. by changing the subtracted temperature (10° C. in the above case) as appropriate.

The comparator 31c compares the outside air temperature estimated by the outside air temperature estimation circuit 21 (see FIG. 1) or the measured outside air temperature and 10° C., and outputs a flag "1" when the outside air temperature is lower than 10° C. The comparator 31c outputs a flag "0" when the outside air temperature is 10° C. or higher. This is because when the outside air temperature 10° C. or higher, the inside of the vehicle does not need to be heated, and therefore the flag is set at "0" to not perform control for setting the lower limit value of the engine rotation speed at the temperature re-raising-state lower limit rotation speed.

When the flags outputted from the comparators 31b and 31c are both "1", the AND circuit 31e outputs a flag "1" to "set" of the arithmetic unit 31f. The arithmetic unit 31f outputs a flag "1" to the input terminal p13 of the switcher 34d. In sum, the temperature re-raise determination circuit 31 outputs a flag "1" when the cooling water temperature drops to 60° C. (first threshold temperature) and the outside air temperature is lower than 10° C. Meanwhile, when the heating request flag is switched from "1" to "0", the NOT circuit 31d outputs a flag "1" to "clear" of the arithmetic unit 31f. As a result, the flag to be outputted from the arithmetic unit 31f is cleared to (Configuration and Operation of Temperature Raise Determination Circuit 32)

Next, the temperature raise determination circuit 32 will be described. The temperature raise determination circuit 32 includes an edge detector 32a, a NOT circuit 32b, and an arithmetic unit 32c.

The edge detector 32a outputs a flag "1" at an edge at which the heating request flag switches from "1" to "0".

The arithmetic unit 32c sets its output flag at "1" upon input of a flag "1" into "set". Also, when the ignition of the vehicle is turned off, the NOT circuit 32b inputs a flat "1" to "clear" of the arithmetic unit 32c. As a result, the flag to be outputted from the arithmetic unit 32c is cleared to "0".

(Description of Maps 34a, 34b, and 34c)

Figure 3:
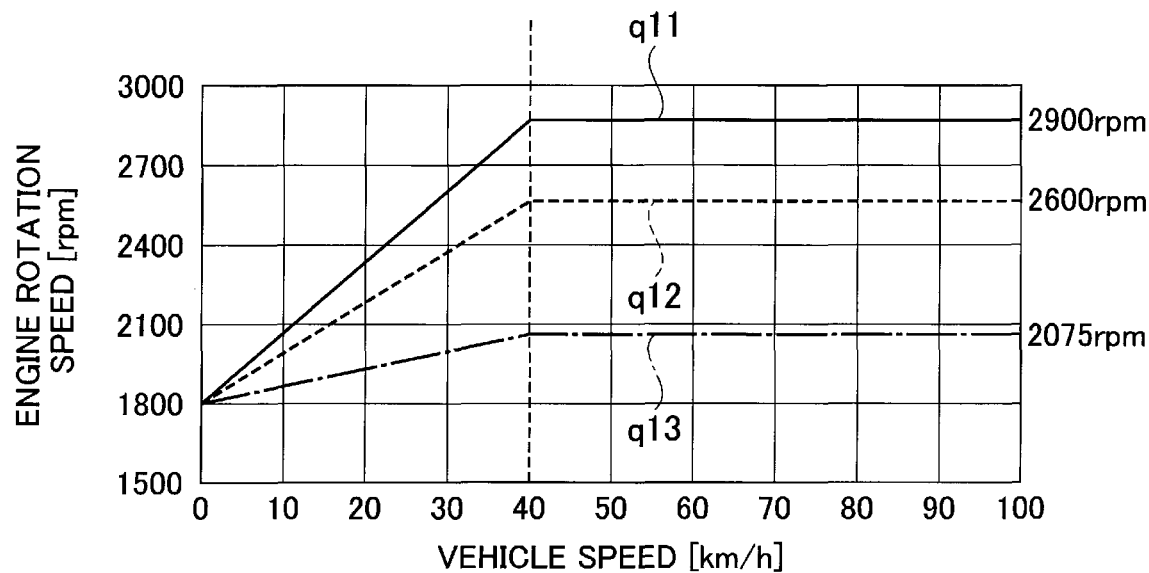
FIG. 3 is a timing chart illustrating the relationship between the vehicle speed and outside air temperature and the lower limit value of the engine rotation speed when the temperature of the cooling water is raised.

Next, the maps 34a, 34b, and 34c, which are provided in the traveling-state operating point setting circuit 34, will be described. FIG. 3 is a diagram illustrating an example of a map indicating the temperature raising-state lower limit rotation speed (temperature raising-state lower limit heat generation amount) in a state where the vehicle is traveling, and corresponds to the map 34a in FIG. 2. A curve q11, a curve q12, and a curve q13 illustrated in FIG. 3 represent a case where the outside air temperature is −20° C., a case where the outside air temperature is −10° C., and a case where the outside air temperature is 0° C., respectively.

For each of the outside air temperatures, the lower limit value of the engine rotation speed is set at 1800 rpm when the vehicle speed is 0 km/h (stopped), and rises at a constant rate until the vehicle speed reaches 40 km/h. In other words, the lower limit value increases monotonically. Thereafter, the lower limit value is set at a constant rotation speed. For example, with the curve q11 for an outside air temperature of −20° C., the lower limit value of the engine rotation speed rises to 2900 rpm when the vehicle speed is 40 km/h, after which the value remains at 2900 rpm. In sum, the lower limit value of the engine rotation speed is raised as the vehicle speed rises, and the lower limit value of the engine rotation speed is raised as the outside air temperature drops. Moreover, the engine rotation speed is raised as the vehicle speed rises, and the engine rotation speed is raised as the outside air temperature drops. Note that the engine output torque is set at the lowermost limit value.

Figure 4:
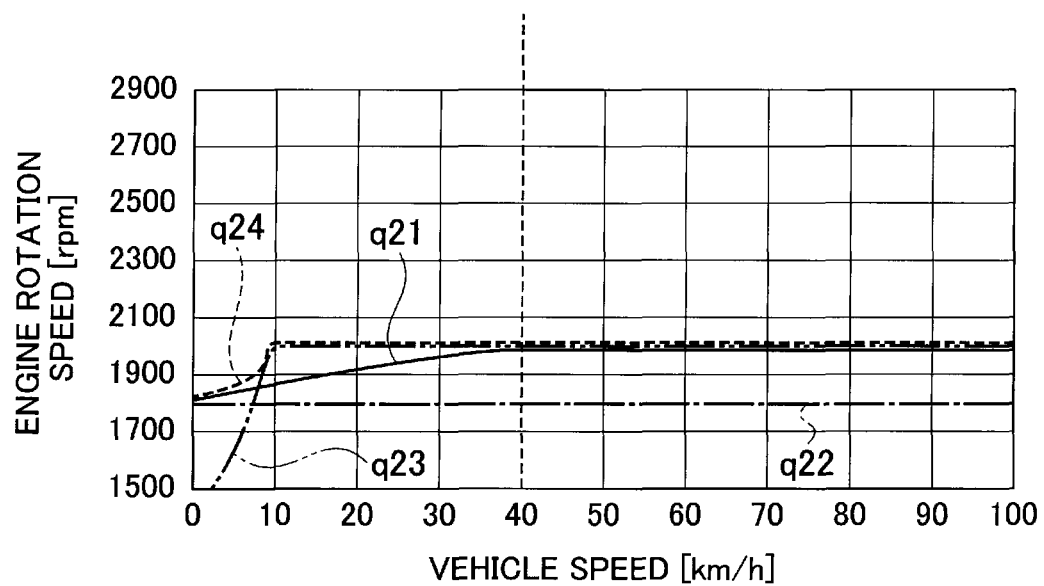
FIG. 4 is a timing chart illustrating the relationship between the vehicle speed and outside air temperature and the lower limit value of the engine rotation speed when the cooling water temperature is maintained.

FIG. 4 is a diagram illustrating an example of a map indicating the maintaining-state lower limit rotation speed (maintaining-state lower limit heat generation amount) in a state where the vehicle is traveling, and corresponds to the map 34b in FIG. 2. A curve q21 and a curve q22 illustrated in FIG. 4 represent a case where the outside air temperature is −20° C. and a case where the outside air temperature is −10° C. and 0° C., respectively. Further, a curve q23 represents the R/L (Road/Load) rotation speed (the engine rotation speed in a no-load state).

A curve q24 representing the selection of the higher of the curve q21 or q22 and the curve q23 is set as the lower limit value of the engine rotation speed. Thus, the curve q21 is selected when the vehicle speed is lower than approximately 8 km/h, after which the curve q23 is selected, so that the lower limit value of the engine rotation speed is set at 2000 rpm.

Meanwhile, though not illustrated, the correspondence between the vehicle speed and outside air temperature and the temperature re-raising-state lower limit rotation speed is set in the map 34c, which indicates the temperature re-raising-state lower limit rotation speed to be used when the output flag of the arithmetic unit 31f in the temperature re-raise determination circuit 31 illustrated in FIG. 2 is "1".

FIGS. 3 and 4 illustrate maps indicating the lower limit values of the engine rotation speed for three outside air temperatures of −20° C., −10° C., and 0° C. Note, however, that the lower limit value of the engine rotation speed can be set more precisely by setting the maps with smaller temperature intervals (e.g., 5° C. intervals).

[Description of Operation in This Embodiment]

Figure 5:
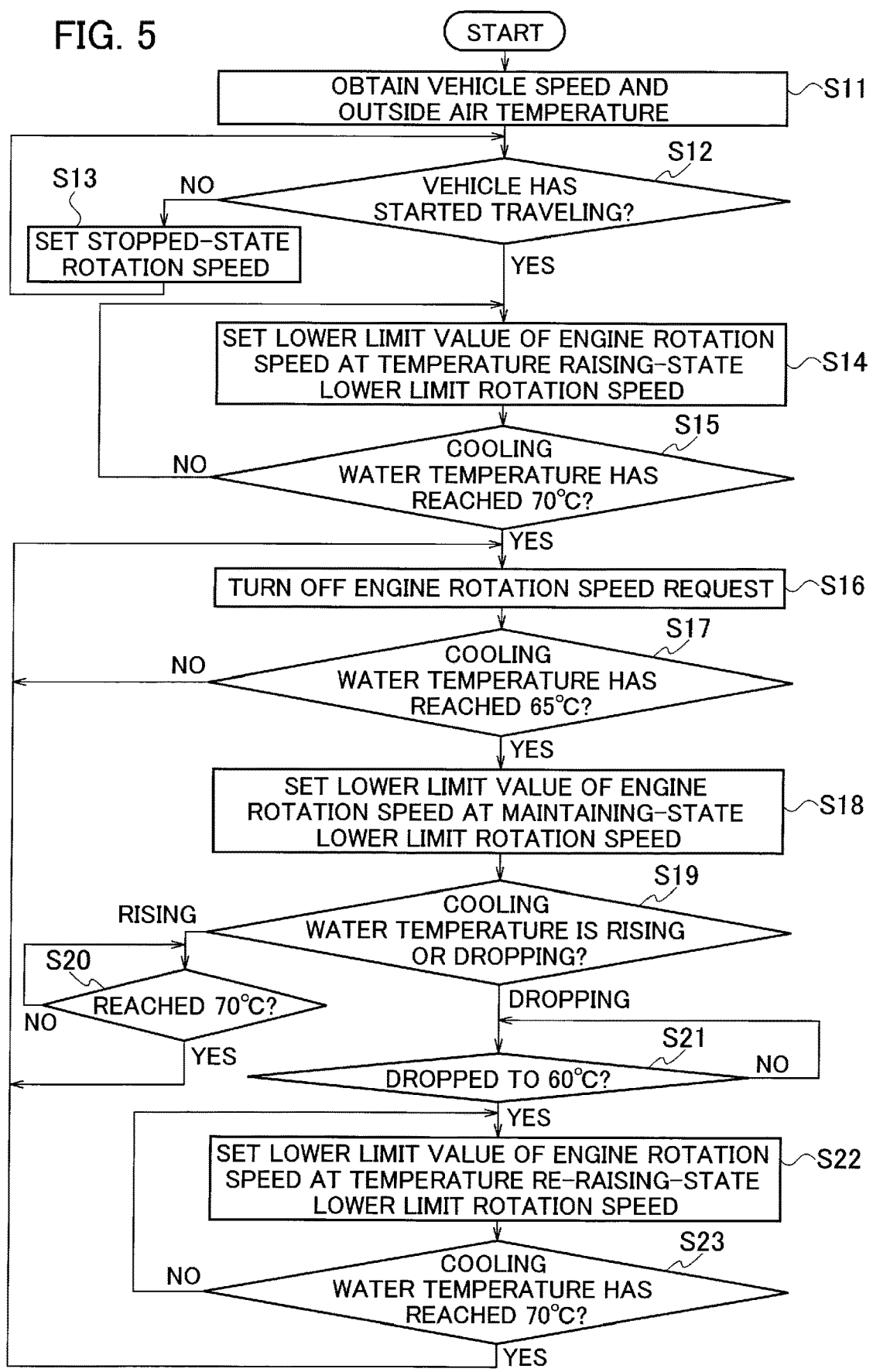
FIG. 5 is a flowchart illustrating processing operation of the engine cooling water temperature control apparatus according to the embodiment of the present invention.
Figure 6:
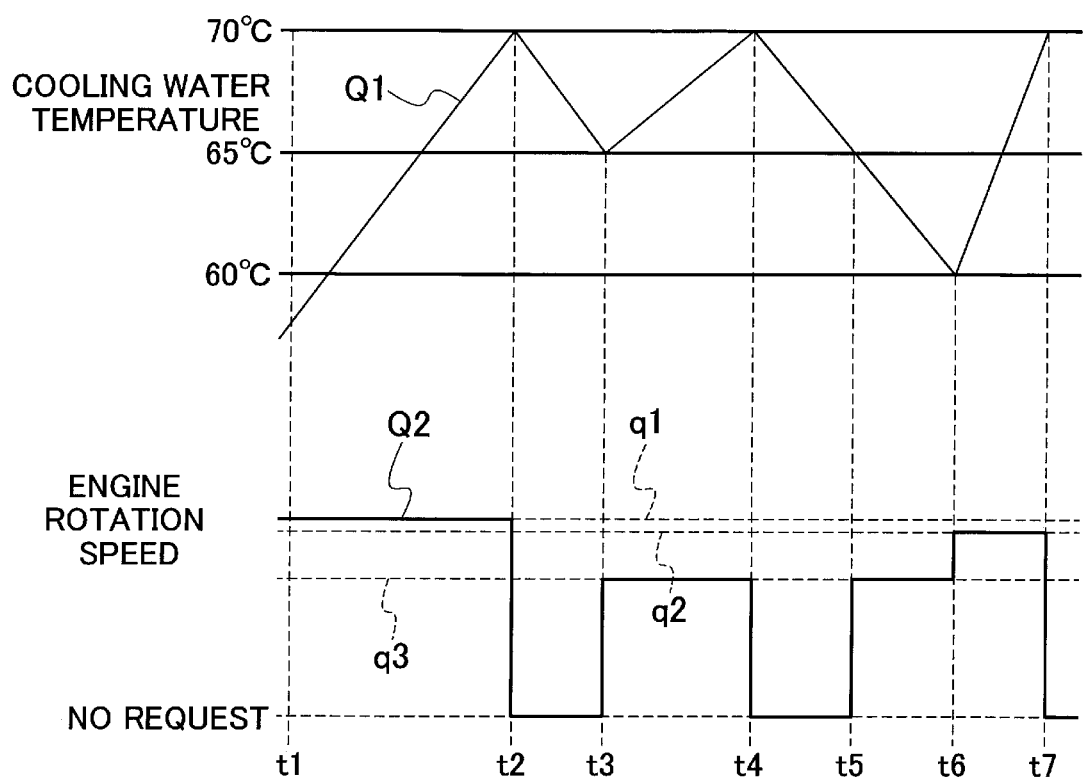
FIG. 6 is a graph illustrating the relationship between changes in engine rotation speed and cooling water temperature.

Next, the flow of a process by the engine cooling water temperature control apparatus 100 according to this embodiment described above will be described with reference to a flowchart illustrated in FIG. 5 and a timing chart illustrated in FIG. 6. The process illustrated in FIG. 5 is executed by the operating point computation circuit 23 illustrated in FIG. 1.

Firstly, in step S11, the operating point computation circuit 23 obtains the vehicle speed and the outside air temperature. In an example, the operating point computation circuit 23 obtains the vehicle speed from the output signal of the wheel speed sensor. Alternatively, the operating point computation circuit 23 can obtain the vehicle speed from the ECU (Electronic Control Unit) mounted in the vehicle. The operating point computation circuit 23 also obtains the outside air temperature estimated by the outside air temperature estimation circuit 21 illustrated in FIG. 1. Alternatively, the operating point computation circuit 23 may obtain data measured by the outside air temperature sensor provided on the outside of the vehicle.

In step S12, the operating point computation circuit 23 determines whether the vehicle has started traveling. If the vehicle is in a stopped state (NO in S12), the stop determination circuit 33 illustrated in FIG. 1 determines that the vehicle is in a stopped state. Then in step S13, the stopped-state operating point setting circuit 36 sets the lower limit value of the engine rotation speed at the rotation speed for the stopped state. Specifically, as illustrated in FIG. 3, the stopped-state operating point setting circuit 36 sets the lower limit value of the engine rotation speed at 1800 rpm, which is a rotation speed for a state where the vehicle speed is zero. Further, when it is determined based on an air conditioner/heater setting temperature signal that quick heating is necessary, the quick heating setting circuit 35 sets and outputs an engine rotation speed for quick heating. Then, the second selection circuit 38 selects the higher of the engine rotation speed outputted from the stopped-state operating point setting circuit 36 and the engine rotation speed outputted from the quick heating setting circuit 35 and outputs the higher speed to the rotation speed mediation circuit 12.

On the other hand, if the vehicle has started traveling (YES in S12), then in step S14, the operating point computation circuit 23 sets the lower limit value of the engine rotation speed at the temperature raising-state lower limit rotation speed. Further, the operating point computation circuit 23 causes the engine to perform firing operation at a rotation speed higher than or equal to this temperature raising-state lower limit rotation speed. Details will be described below.

In the case where the heating request flag "1", requesting actuation of the heating function, is inputted into the temperature raise determination circuit 32 illustrated in FIG. 2 and is then switched to "0", the edge detector 32a detects the fall of the heating request flag (turn-off timing). The heating request flag is "1" when the vehicle starts operating. The heating request flag is set from "1" to "0" when the cooling water temperature shifts from a state where it is lower than 70° C. (upper limit temperature; third threshold value) to a state where it is higher than 70° C. The heating request flag is set from "0" to "1" when the cooling water temperature shifts from a state where it is higher than 65° C. (the temperature obtained by subtracting the hysteresis value from the upper limit temperature; second threshold value) to a state where it is lower than 65° C. Note that the second threshold value can be changed to a temperature other than 65° C. by changing the subtracted hysteresis value (5° C. in the above case) as appropriate. Thus, if the cooling water temperature has not reached 70° C. after the vehicle started operating, the heating request flag is "1" and the output flag of the edge detector 32a is "0". A flag "0" is inputted into "set" of the arithmetic unit 32c, so that the output flag of the arithmetic unit 32c is "0". If the cooling water temperature then reaches 70° C., the output flag of the edge detector 32a is set to "1", so that the output flag of the arithmetic unit 32c switches to "1". In other words, the output flag of the arithmetic unit 32c represents a temperature raise completion determination flag.

If the output flag of the arithmetic unit 32c is "0", that is, if the cooling water temperature has not reached 70° C., the output terminal p24 of the switcher 34e is connected to the input terminal p22 (the map 34a side). Thus, the output of the map 34a, which indicates the temperature raising-state lower limit rotation speed, is selected.

Meanwhile, since the vehicle speed and the outside air temperature are inputted into the map 34a of the traveling-state operating point setting circuit 34, the lower limit value of the engine rotation speed (temperature raising-state lower limit rotation speed) is obtained by applying the vehicle speed and the outside air temperature to the map 34a (see FIG. 3). When, for example, the outside air temperature is −20° C. and the vehicle speed is 40 km/h, the temperature raising-state lower limit rotation speed is 2900 rpm, as illustrated in FIG. 3. This temperature raising-state lower limit rotation speed is outputted to the rotation speed mediation circuit 12 illustrated in FIG. 1, and the engine rotation speed is controlled accordingly. As a result, the engine rotation speed rises and thus the cooling water temperature rises.

This will be described with reference to the timing chart illustrated in FIG. 6. In FIG. 6, a curve Q1 represents the change in the cooling water temperature, and a curve Q2 represents the change in the engine rotation speed. When the vehicle starts traveling and a heating request occurs, so that the heating request flag is set at "1", the map 34a, which indicates the temperature raising-state lower limit rotation speed, is referred to, and the engine rotation speed is set at a temperature raising-state lower limit rotation speed q1 (e.g., 2900 rpm). Thus, the engine is caused to perform firing operation at a rotation speed of 2900 rpm or higher, so that the cooling water temperature Q1 rises.

Then, in step S15 illustrated in FIG. 5, the operating point computation circuit 23 determines whether the cooling water temperature has reached 70° C. (third threshold value). If the cooling water temperature has not reached 70° C., the process returns to step S14. If the cooling water temperature has reached 70° C., then in step S16, the operating point computation circuit 23 turns off the engine rotation speed request. Specifically, the lower limit value of the engine rotation speed is not set. This will be described below in detail with reference to FIG. 2.

Since the cooling water temperature has reached 70° C. once (see a time t2 in FIG. 6), the temperature raise completion determination flag outputted from the arithmetic unit 32c is "1". Thus, the output terminal p24 of the switcher 34e is connected to the input terminal p21. In other words, the connection has been switched from the input terminal p22 to the input terminal p21.

Here, the cooling water temperature has not dropped to 60° C. (has not dropped by 10° C. or more from 70° C.), the output flag of the comparator 31b of the temperature re-raise determination circuit 31 illustrated in FIG. 2 is "0". Since the output flag of the AND circuit 31e is also "0", the output flag of the arithmetic unit 31f is "0" as well. Thus, a flag "0" is inputted into the input terminal p13 of the switcher 34d, so that the output terminal p14 is connected to the input terminal p12. Hence, the map 34b, which indicates the maintaining-state lower limit rotation speed, is selected. Here, as mentioned earlier, until the cooling water temperature drops to 65° C., the heating request flag is "0" and thus the lower limit value of the engine rotation speed is not set. Specifically, when the heating request flag is "0", control is performed such that the maintaining-state lower limit rotation speed is not outputted from the map 34b even if the input terminal p12 and the output terminal p14 of the switcher 34d illustrated in FIG. 2 are connected. Alternatively, when the heating request flag is "0", control is performed such that the output of the traveling-state operating point setting circuit 34 illustrated in FIG. 1 is not selected. Thus, the engine rotation speed request is turned off until the cooling water temperature drops from 70° C. to 65° C. (see t2 to t3 in FIG. 6). In this period, the engine is caused to perform motoring operation.

In step S17 in FIG. 5, the operating point computation circuit 23 determines whether the cooling water temperature had dropped to 65° C. If the cooling water temperature has not dropped to 65° C., the process returns to step S16. If the cooling water temperature has dropped to 65° C., then in step S18, the operating point computation circuit 23 executes a process of setting the lower limit value of the engine rotation speed at the maintaining-state lower limit rotation speed. Specifically, the operating point computation circuit 23 sets the lower limit value of the engine rotation speed based on the map 34b of the traveling-state operating point setting circuit 34 illustrated in FIG. 2. More specifically, referring to the graph illustrated in FIG. 4, the operating point computation circuit 23 sets the lower limit value of the engine rotation speed based on the vehicle speed and the outside air temperature.

As a result, the engine rotation speed rises, and the cooling water temperature changes accordingly. This will be described with reference to the graph illustrated in FIG. 6. In the period from t3 to t4, the engine rotation speed Q2 is set at a maintaining-state lower limit rotation speed q3, so that the cooling water temperature Q1 rises. In the period from t5 to t6, however, the engine rotation speed Q2 is raised to the maintaining-state lower limit rotation speed q3 but the cooling water temperature Q1 drops. In sum, there are a case where the cooling water temperature Q1 turns to rise after the maintaining-state lower limit rotation speed q3 is set and a case where the cooling water temperature Q1 continues dropping after the maintaining-state lower limit rotation speed q3 is set.

In step S19 in FIG. 5, the operating point computation circuit 23 determines whether the cooling water temperature is rising or dropping. If the cooling water temperature is rising, then in step S20, the operating point computation circuit 23 determines whether the cooling water temperature has reached 70° C. If the cooling water temperature has reached 70° C., the process returns to step S16.

On the other hand, if the cooling water temperature is dropping, then in step S21, the operating point computation circuit 23 determines whether the cooling water temperature has dropped to 60° C. If the cooling water temperature has dropped to 60° C., then in step S22, the operating point computation circuit 23 sets the lower limit value of the engine rotation speed at the temperature re-raising-state lower limit rotation speed. This will be described below in detail with reference to FIG. 2.

Since the cooling water temperature has reached 70° C. once, the temperature raise completion determination flag outputted from the arithmetic unit 32c is "1". Thus, the output terminal p24 of the switcher 34e is connected to the input terminal p21.

Also, the cooling water temperature has dropped to 60° C. (has dropped by 10° C. or more from 70° C.), the output flag of the comparator 31b of the temperature re-raise determination circuit 31 illustrated in FIG. 2 is "1". Since the output flag of the AND circuit 31e is also "1", the output flag of the arithmetic unit 31f is "1" as well.

Thus, the output terminal p14 of the switcher 34d is connected to the input terminal p11. Hence, the map 34c, which indicates the temperature re-raising-state lower limit rotation speed, is selected. As indicated by reference sign q2 in FIG. 6, the temperature re-raising-state lower limit rotation speed set by this map 34c is set to be lower than the temperature raising-state lower limit rotation speed q1 and higher than the maintaining-state lower limit rotation speed q3. Thus, the cooling water temperature Q1 is raised as illustrated in the period from t6 to t7 in FIG. 6 by setting the engine rotation speed Q2 at the temperature re-raising-state lower limit rotation speed q2.

Thereafter, in step S23, the operating point computation circuit 23 determines whether the cooling water temperature has reached 70° C. If the cooling water temperature has not reached 70° C., the process returns to step S22. If the cooling water temperature has reached 70° C., the process returns to step S16.

Then, the lower limit value of the engine rotation speed set by one of the maps 34a, 34b, and 34c is compared with the lower limit value of the engine rotation speed for quick heating at the first selection circuit 37 illustrated in FIG. 1, and the larger value is selected and outputted to the rotation speed mediation circuit 12.

The engine rotation speed is controlled to be the set lower limit value by the rotation speed mediation circuit 12. In this manner, the cooling water temperature is immediately raised to the third threshold value (70° C.), which is the upper limit temperature, and then maintained in the range of 60° C. to 70° C.

In this embodiment, the lower limit value of the engine rotation speed is set in order to make the cooling water temperature quickly rise and reach a desired temperature. The engine rotation speed can be raised to above the lower limit value according to conditions other than the heating condition such as the driving condition and the environmental condition. That is, the lower limit value of the engine rotation speed set in this embodiment represents the minimum required engine rotation speed, and the engine rotation speed may be raised to above it.

Figure 7:
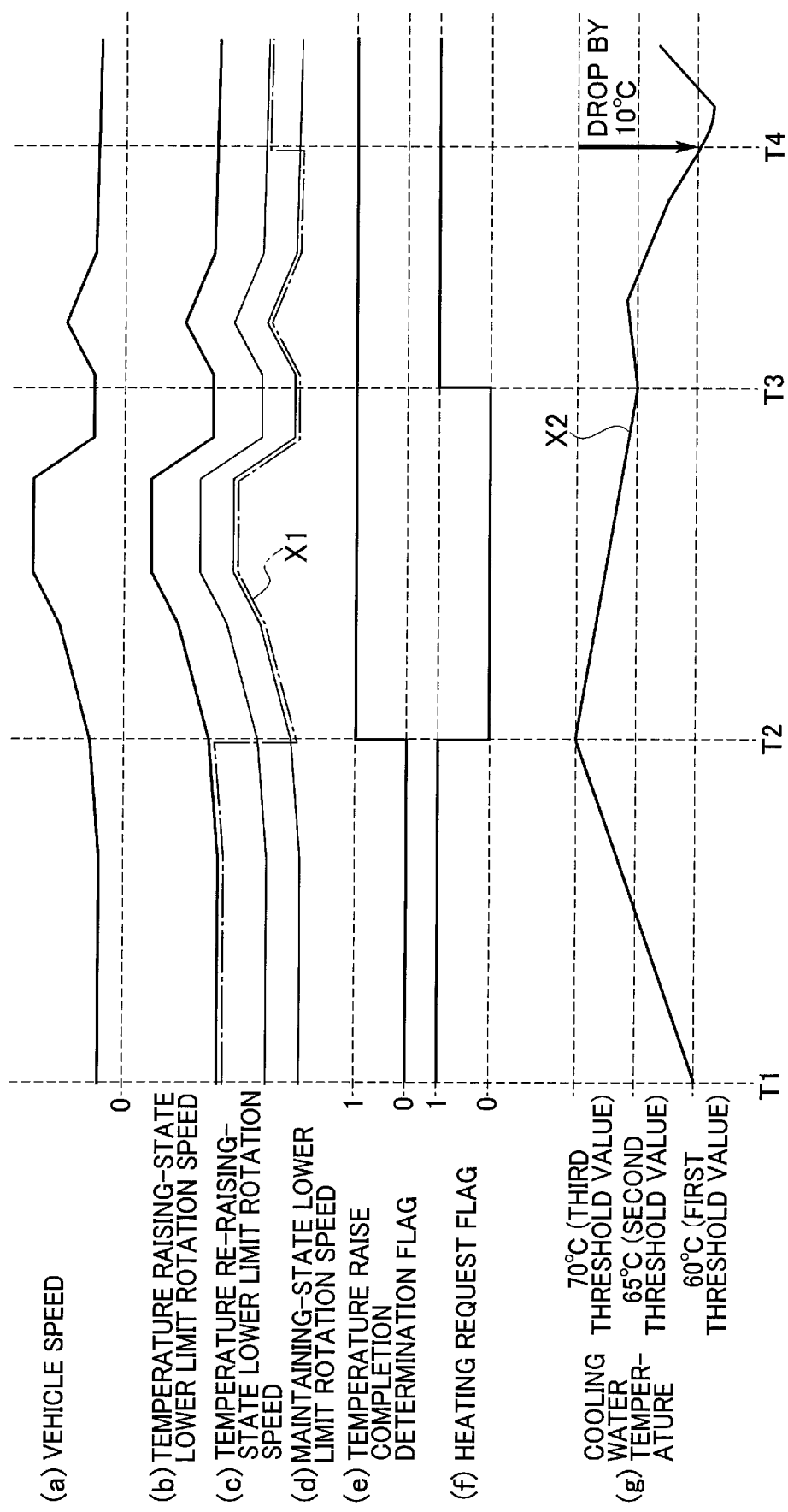
FIG. 7 is a timing chart illustrating changes in (a) vehicle speed, (b) temperature raising-state lower limit rotation speed, (c) temperature re-raising-state lower limit rotation speed, (d) maintaining-state lower limit rotation speed, (e) temperature raise completion determination flag, (f) heating request flag, and (g) cooling water temperature.

Next, the above operation will be described with reference to a timing chart illustrated in FIG. 7. In FIG. 7, (a) indicates the vehicle speed, (b) indicates the temperature raising-state lower limit rotation speed, (c) indicates the temperature re-raising-state lower limit rotation speed, (d) indicates the maintaining-state lower limit rotation speed, (e) indicates the temperature raise completion determination flag, (f) indicates the heating request flag, and (g) indicates the cooling water temperature. Also, a curve X1 indicates the change in the engine rotation speed, and a curve X2 indicates the change in the cooling water temperature.

As illustrated in FIG. 7(a), when the vehicle starts traveling and the vehicle speed rises at a time T1, the heating request flag is set at "1". Also, the temperature raise completion determination flag is "0". Thus, the lower limit value of the engine rotation speed is set at the temperature raising-state lower limit rotation speed illustrated in FIG. 7(b). As the engine rotation speed X1 rises, the cooling water temperature rises and reaches 70° C. (third threshold value) at a time T2, as illustrated in FIG. 7(g).

With the cooling water temperature having reached 70° C., the heating request flag illustrated in FIG. 7(f) switches from "1" to "0" and the temperature raise completion determination flag illustrated in FIG. 7(e) shifts to "1".

The lower limit value of the engine rotation speed will then not be set until the cooling water temperature drops to 65° C. (second threshold value). Thus, in the period from T2 to T3, the engine rotation speed X1 is set according to the driving condition and the environmental condition.

When the cooling water temperature drops to 65° C. at the time T3, the heating request flag switches to "1", and the lower limit value of the engine rotation speed is set at the maintaining-state lower limit rotation speed illustrated in FIG. 7(d). As a result, the cooling water temperature slightly rises, but immediately turns to drop and drops to 60° C. (first threshold value) at a time T4.

With the cooling water temperature having dropped to 60° C., the lower limit value of the engine rotation speed is set at the temperature re-raising-state lower limit rotation speed illustrated in FIG. 7(c). As a result, the cooling water temperature turns to rise. When the cooling water temperature then reaches 70° C., a similar process will be repeated to control the cooling water temperature at desired temperature.

(Description of Measure Against Noise)

Figure 8:
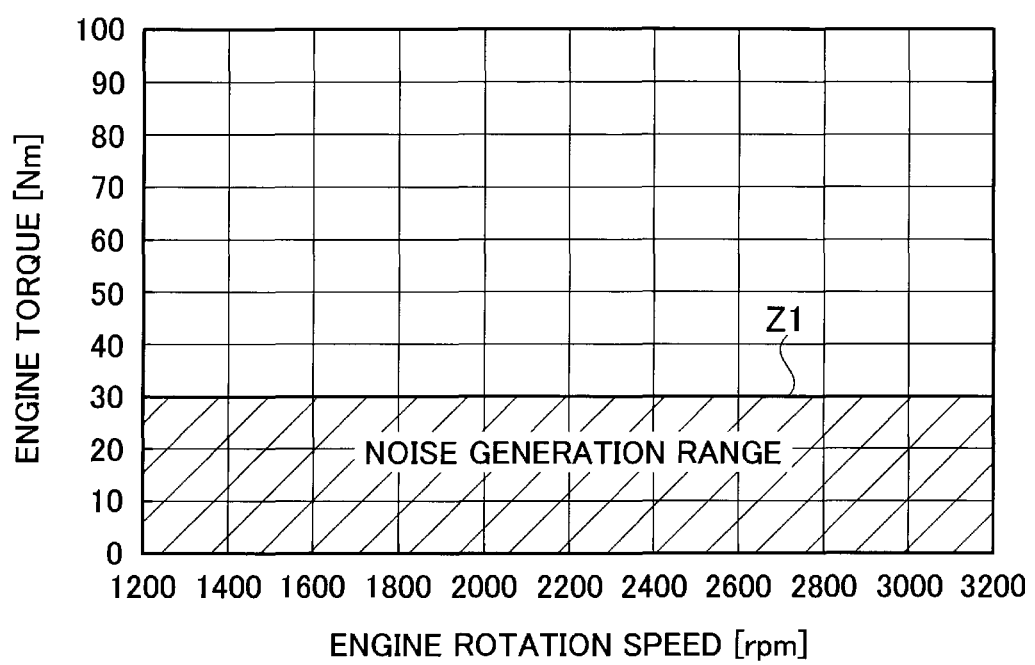
FIG. 8 is a timing chart illustrating the relationship between the engine rotation speed and the engine torque, and a noise generation range.

Next, a description will be given of reduction of the noise generated by changing the rotation speed of the engine. This embodiment aims at quickly raising the cooling water temperature to enable actuation of the heating function. Hence, the engine torque during firing operation should preferably be as low as possible. However, reducing the engine torque may result in generation of noise from the brake mechanism, its surroundings, and so on. FIG. 8 is a graph illustrating a noise generation range with respect to changes in the engine rotation speed and the engine torque. As illustrated in FIG. 8, it is understood that the noise is generated in the range in which the engine torque is lower than 30 Nm.

In this embodiment, as illustrated in FIG. 8, the engine torque is set to be at the upper limit value of the noise generation range, in other words, the lower limit torque at which the noise is suppressed (see Z1 in the figure), in order to suppress the generation of the noise. Doing so makes it possible to set a lower engine torque while suppressing the generation of the noise. Doing so also makes it possible to make the charge time (firing) longer than the discharge time (motoring) and is advantageous in quickly raising the cooling water temperature.

[Description of Advantageous Effects of This Embodiment]

As described above, the engine cooling water temperature control apparatus 100 according to the present invention achieves the advantageous effects described below.

The lower limit value of the engine rotation speed is set as appropriate according to the outside air temperature and the vehicle speed. Thus, the cooling water temperature of the engine is quickly raised in the range of 60° C., which is lower than 70° C., or the upper limit temperature, to 70° C. This enables quick actuation of the heating function inside the vehicle.

(2) The lower limit value of the engine rotation speed (engine heat generation amount) is raised as the vehicle speed rises. Thus, even when the vehicle speed is so high that the cooling water temperature does not easily rise, the cooling water temperature is quickly raised.

(3) The engine rotation speed is raised as the vehicle speed rises to thereby increase the engine heat generation amount. Thus, even when the vehicle speed is so high that the cooling water temperature does not easily rise, the cooling water temperature is quickly raised by increasing the heat generation amount.

(4) The lower limit value of the engine rotation speed (engine heat generation amount) is raised as the outside air temperature drops. Thus, even when the outside air temperature is so low that the cooling water temperature does not easily rise, the cooling water temperature is quickly raised.

(5) The engine rotation speed is raised as the outside air temperature drops to thereby increase the engine heat generation amount. Thus, even when the outside air temperature is so low that the cooling water temperature does not easily rise, the cooling water temperature is quickly raised by increasing the heat generation amount.

(6) If the cooling water temperature is below 60° C. (first threshold value) when the vehicle starts traveling, the lower limit value of the engine rotation speed is set at the temperature raising-state lower limit rotation speed (temperature raising-state lower limit heat generation amount). Thus, the cooling water temperature is quickly raised. When the cooling water temperature reaches 70° C. (third threshold value), the lower limit value of the engine rotation speed is not set and the rotation speed request is turned off. Thus, the cooling water temperature drops and is prevented rising excessively. When the cooling water temperature drops to 65° C. (second threshold value), the lower limit value of the engine rotation speed is set at the maintaining-state lower limit rotation speed (maintaining-state lower limit heat generation amount). Thus, the cooling water temperature is raised. Also, when the maintaining-state lower limit rotation speed is set but the cooling water temperature still drops, the lower limit value of the engine rotation speed is set at the temperature re-raising-state lower limit rotation speed. Thus, the cooling water temperature is certainly raised.

(7) If the cooling water temperature is below 60° C. (first threshold value) when the vehicle starts traveling, the engine is caused to perform firing operation and the lower limit value of the engine rotation speed is set at the temperature raising-state lower limit rotation speed (temperature raising-state lower limit heat generation amount). Thus, the cooling water temperature is quickly raised. When the cooling water temperature reaches 70° C. (third threshold value), the engine is caused to perform motoring operation and not to fire. Thus, the cooling water temperature drops and is prevented rising excessively. When the cooling water temperature drops to 65° C. (second threshold value), the engine is caused to perform firing operation and the lower limit value of the engine rotation speed is set at the maintaining-state lower limit rotation speed (maintaining-state lower limit heat generation amount). Thus, the cooling water temperature is re-raised.

In this case, when the cooling water temperature is initially raised, the initial cooling water temperature is low. Hence, even if the engine rotation speed (engine heat generation amount) is significantly raised, the occupant feels that it is acceptable. However, when the temperature of the cooling water is raised for the second or later time, the cooling water temperature is higher than that in the first temperature raise, and the occupant may experience a feeling of strangeness. For this reason, the temperature re-raising-state lower limit rotation speed is set to be lower than the temperature raising-state lower limit rotation speed.

(8) The engine heat generation amount is controlled by controlling the engine rotation speed. Thus, the engine heat generation amount is controlled by a simple method.

(9) The lower limit value of the engine rotation speed is set at an identical numeral value in firing operation and motoring operation. This reduces a feeling of strangeness due to a change in sound. Specifically, motoring operation is sometimes performed in order to lower the SOC of the battery, and setting a higher rotation speed than that in firing operation is effective in quickly lowering the SOC. However, a change in rotation speed leads to a change in sound, which in turn causes a feeling of strangeness. To avoid this, the lower limit rotation speed is set to be identical in firing operation and motoring operation.

(10) The engine output torque is set above the torque range in which noise is generated. This prevents generation of uncomfortable noise due to low engine rotation speed. Moreover, the output torque is set at the upper limit of the torque range in which the noise is generated, in other words, the lowest possible output torque with which the generation of the noise can be prevented. Thus, the duration of firing operation is longer and the duration of motoring operation is shorter, and therefore the cooling water temperature is raised more quickly.

Although an embodiment of the present invention has been described above, it should not be understood that the statement and the drawings constituting part of this disclosure limit this invention. Various alternative embodiments, examples, and operation techniques will become apparent to those skilled in the art from this disclosure.

REFERENCE SIGNS LIST 11 water temperature control circuit
12 rotation speed mediation circuit
21 outside air temperature estimation circuit
22 heating request determination circuit
23 operating point computation circuit
31 temperature re-raise determination circuit
31a subtractor
31b comparator
31c comparator
31d NOT circuit
31e AND circuit
31f arithmetic unit
32 temperature raise determination circuit
32a edge detector
32b NOT circuit 32c arithmetic unit
33 stop determination circuit
34 traveling-state operating point setting circuit
34a, 34b, 34c map
34d, 34e switcher
35 quick heating setting circuit
36 stopped-state operating point setting circuit
37 first selection circuit
38 second selection circuit
100 engine cooling water temperature control apparatus
p11 to p13, p21 to p23 input terminal
p14, p24 output terminal

The invention claimed is:

1. An engine cooling water temperature control method of controlling cooling water temperature of an engine mounted in a vehicle, comprising
setting a lower limit value of an engine rotation speed according to a factor of drop in the cooling water temperature, wherein
the lower limit value of the engine rotation speed is set at a temperature raising-state lower limit rotation speed when the cooling water temperature drops below a preset first threshold value,
the lower limit value of the engine rotation speed is not set when the cooling water temperature rises to a third threshold value higher than the first threshold value, and
the lower limit value of the engine rotation speed is set at a maintaining-state lower limit rotation speed lower than the temperature raising-state lower limit rotation speed when the cooling water temperature drops below a second threshold value higher than the first threshold value and lower than the third threshold value.

2. The engine cooling water temperature control method according to claim 1, wherein the factor of drop in the cooling water temperature is vehicle speed, and the lower limit value of the engine rotation speed is raised as the vehicle speed rises.

3. The engine cooling water temperature control method according to claim 1, wherein the factor of drop in the cooling water temperature is vehicle speed, and
the engine cooling water temperature control method further comprises raising the engine rotation speed as the vehicle speed rises.

4. The engine cooling water temperature control method according to claim 1, wherein the factor of drop in the cooling water temperature is outside air temperature, and the lower limit value of the engine rotation speed is raised as the outside air temperature drops.

5. The engine cooling water temperature control method according to claim 1, wherein the factor of drop in the cooling water temperature is outside air temperature, and
the engine cooling water temperature control method further comprises raising the engine rotation speed as the outside air temperature drops.

6. The engine cooling water temperature control method according to claim 1, wherein
the engine is capable of switching between firing operation in which the engine is caused to fire and motoring operation in which the engine is not caused to fire,
the engine is caused to perform the firing operation and the temperature raising-state lower limit rotation speed is set to raise the cooling water temperature when the cooling water temperature drops below the first threshold value,
the engine is caused to perform the motoring operation when the cooling water temperature rises to the third threshold value, and
the firing operation is performed and the maintaining-state lower limit rotation speed is set to raise the cooling water temperature when the cooling water temperature drops below the second threshold value.

7. The engine cooling water temperature control method according to claim 6, wherein
a temperature re-raising-state lower limit rotation speed lower than the temperature raising-state lower limit rotation speed and higher than the maintaining-state lower limit rotation speed is set, and
the lower limit value of the engine rotation speed is set at the temperature re-raising-state lower limit rotation speed to raise the cooling water temperature when the maintaining-state lower limit rotation speed is set but the cooling water temperature does not rise.

8. The engine cooling water temperature control method according to claim 6, wherein the lower limit value of the engine rotation speed is set at an identical rotation speed in the firing operation and the motoring operation.

9. The engine cooling water temperature control method according to claim 6, wherein torque in the firing operation is a lower limit torque above a torque range in which noise is generated.

10. An engine cooling water temperature control apparatus for controlling cooling water temperature of an engine mounted in a vehicle, comprising
a lower limit value setting unit that sets a lower limit value of an engine rotation speed according to a factor of drop in the cooling water temperature, wherein the lower limit value setting unit
sets the lower limit value of the engine rotation speed at a temperature raising-state lower limit rotation speed when the cooling water temperature drops below a preset first threshold value,
does not set the lower limit value of the engine rotation speed when the cooling water temperature rises to a third threshold value higher than the first threshold value, and
sets the lower limit value of the engine rotation speed at a maintaining-state lower limit rotation speed lower than the temperature raising-state lower limit rotation speed when the cooling water temperature drops below a second threshold value higher than the first threshold value and lower than the third threshold value.

11. The engine cooling water temperature control apparatus according to claim 10, wherein
the engine is capable of switching between firing operation in which the engine is caused to fire and motoring operation in which the engine is not caused to fire, and
the engine cooling water temperature control apparatus further comprises an operating point computation circuit that
causes the engine to perform the firing operation and sets the temperature raising-state lower limit rotation speed to raise the cooling water temperature when the cooling water temperature drops below the first threshold value,
causes the engine to perform the motoring operation when the cooling water temperature rises to the third threshold value, and
performs the firing operation and sets the maintaining-state lower limit rotation speed to raise the cooling water temperature when the cooling water temperature drops below the second threshold value.

\* \* \* \* \*